United States Patent
Meirosu et al.

(10) Patent No.: US 11,218,452 B2
(45) Date of Patent: Jan. 4, 2022

(54) METHOD AND ARRANGEMENT FOR SELECTIVELY MIGRATING DATA OF A VIRTUALIZED NETWORK FUNCTION

(71) Applicant: Telefonaktiebolaget LM Ericsson (publ), Stockholm (SE)

(72) Inventors: Catalin Meirosu, Solna (SE); Wolfgang John, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 16/311,675

(22) PCT Filed: Jul. 11, 2016

(86) PCT No.: PCT/SE2016/050709
§ 371 (c)(1),
(2) Date: Dec. 19, 2018

(87) PCT Pub. No.: WO2018/013018
PCT Pub. Date: Jan. 18, 2018

(65) Prior Publication Data
US 2019/0207909 A1    Jul. 4, 2019

(51) Int. Cl.
*H04L 29/06* (2006.01)
*G06F 21/78* (2013.01)
(Continued)

(52) U.S. Cl.
CPC ...... *H04L 63/0421* (2013.01); *G06F 9/45558* (2013.01); *G06F 21/53* (2013.01);
(Continued)

(58) Field of Classification Search
CPC ............ H04L 63/0421; H04L 63/0414; H04L 63/029; G06F 21/78; G06F 21/53;
(Continued)

(56) References Cited

U.S. PATENT DOCUMENTS 3,656,178 A * 4/1972 De Maine ........... H03M 7/3066
                                                     341/87
9,384,028 B1 * 7/2016 Felstaine ............... H04L 45/586
(Continued)

OTHER PUBLICATIONS

Scaife et al. "CryptoLock (and Drop It): Stopping Ransomware Attacks on User Data", 2016 IEEE 36th International Conference on Distributed Computing Systems (ICDCS), Date of Conference: Jun. 27-30, 2016.*

(Continued)

*Primary Examiner* — Morshed Mehedi
(74) *Attorney, Agent, or Firm* — NDWE LLP (57) ABSTRACT

An apparatus and a method for selectively migrating data of a virtualized network function (VNF) instance from a first administrative domain to a second administrative domain. The data used within a single process of the VNF instance within the first administrative domain is read. The read data comprises marked data and non-marked data. The marked data is overwritten by anonymous data according to a pre-configured policy. The data, comprising said anonymous data and said non-marked data, is transferred to the second administrative domain. The present disclosure allows determining which areas within a process need to be protected.

18 Claims, 4 Drawing Sheets

(51) Int. Cl.
*G06F 21/53* (2013.01)
*G06F 9/455* (2018.01)

(52) U.S. Cl.
CPC .......... *G06F 21/78* (2013.01); *H04L 63/029* (2013.01); *H04L 63/0414* (2013.01); *G06F 2009/4557* (2013.01); *G06F 2009/45583* (2013.01)

(58) Field of Classification Search
CPC ......... G06F 9/45558; G06F 2009/4557; G06F 2009/45583
See application file for complete search history.

(56) References Cited

U.S. PATENT DOCUMENTS

| | | | |
|---|---|---|---|
| 9,645,899 B1* | 5/2017 | Felstaine | G06F 11/2025 |
| 2012/0117660 A1* | 5/2012 | Domany | H04L 9/321 |
| | | | 726/28 |
| 2014/0095821 A1 | 4/2014 | Yang et al. | |
| 2015/0257173 A1* | 9/2015 | You | H04B 17/318 |
| | | | 370/330 |
| 2016/0149950 A1* | 5/2016 | Ashley | H04L 63/1491 |
| | | | 726/23 |

OTHER PUBLICATIONS

International Search Report and Written Opinion for Application No. PCT/SE2016/050709, dated Feb. 16, 2017, 12 pages.

Brendan Cully et al., "Remus: High Availability via Asynchronous Virtual Machine Replication," 2008, pp. 161-174, NSDI '08: 5th USENIX Symposium on Networked Systems Design and Implementation, USENIX Association.

Kai-Yuan Hou et al., "Application-Assisted Live Migration of Virtual Machines with Java Applications," 2015, 15 pages, EuroSys '15, ACM.

Samuel T. King et al., "Debugging Operating Systems with Time-Traveling Virtual Machines," 2005, pp. 1-15, 2005 USENIX Annual Technical Conference, USENIX Association.

Tianlin Li et al., "Privacy-Preserving Virtual Machine," 2015, 10 pages, ACSAC '15, ACM.

Fengzhe Zhang et al., "PALM: Security Preserving VM Live Migration for Systems with VMM-enforced Protection," 2008, pp. 9-18, Third Asia-Pacific Trusted Infrastructure Technologies Conference, IEEE.

International Preliminary Report on Patentability, PCT App. No. PCT/SE2016/050709, dated Jan. 24, 2019, 10 pages.

* cited by examiner

METHOD AND ARRANGEMENT FOR SELECTIVELY MIGRATING DATA OF A VIRTUALIZED NETWORK FUNCTION

CROSS-REFERENCE TO RELATED APPLICATIONS

This application is a National stage of International Application No. PCT/SE2016/050709, filed Jul. 11, 2016, which is hereby incorporated by reference.

TECHNICAL FIELD

This disclosure concerns migrating data of a virtualized network function (VNF). More particularly, it concerns selectively migrating data of a VNF.

BACKGROUND

Migration of virtual machine (VM) instances is a well-established technique for transferring a state of an application between execution environments in a cloud computing execution environment. The application may be either an enterprise application or a VNF.

Two types of migration are live migration and cold migration, respectively. Live migration is migration of a state of an application while the application is still in service or running. Cold migration is migration of a state of an application, when the application is temporarily paused. The state of the application is then transferred to a new execution location followed by resuming the execution. Migration of a state of an application is accomplished by copying the content, or so called footprint, of the complete memory occupied by the application to the new execution location.

State migration techniques are also used for implementing standby solutions in high-availability environments, where the state of a running application or VNF is continuously transferred to one or multiple copies of VNF instances, which may take over in case the primary VNF instance fails or becomes unavailable.

Debugging applications or VNFs is a problem for vendors developing VNFs. Due to the fact that it is almost impossible for the vendors to replicate the deployment environment as well as the configuration of the VNF instances for all the telecom providers to which a certain VNF has been sold, the problem becomes difficult to solve. Commonly employed techniques comprise creation of troubleshooting tickets that contain attached descriptions or snapshots of the configuration of production VNF instances, which in turn the VNF vendor attempts to replicate in their test labs.

The use of state migration for debugging of applications has been proposed for a data centre (King, S. T. et al., "Debugging operating systems with time-traveling virtual machines", 2005 ISENIX Annual Technical Conference; Cully, B. et al., "Remus: High availability via asynchronous virtual machine replication", NSDI 2008). These solutions propose to copy either an entire state of a primary application instance to a secondary instance that is to be debugged or to an intermediary state known as a checkpoint. Furthermore, it has also been proposed an application-assisted live migration that skips memory pages that are not needed for the application execution at the destination (Hou. K.-Y. et al., "Application-assisted live migration of virtual machines with Java applications", EuroSys 2015).

Li, Ti. et al., disclose in "Privacy-preserving virtual machines, 31th annual computer security applications conference (ACSAC) 2015" to execute a process that contains private data onto a separate lightweight virtual machine that is spawned automatically from the main virtual machine. US20140095821 discloses implementing an application programming interface (API) between an application that has private data and a virtual machine that functions as a check-pointing service. Memory utilized by that application is excluded from check-pointing.

Zhang, F. et al., "PALM: Security preserving VM live migration for systems with VMM-enforced protection. 3rd Asia-pacific trusted infrastructure conference", teaches a control VM executing a migration manager to identify memory locations belonging to protected processes, encrypt the data for transfer and decrypt the data at destination when the protected process is restored in a trusted execution platform.

Some operating systems define special calls that enable to specify that certain parts of memory should not be swapped to disk. Locking memory for a virtual machine may also be enabled so that it is not swapped.

However the above mentioned techniques come with a few disadvantages. Transferring data of a state configuration at a certain time between telco providers and VNF or application vendors may be time consuming on both ends, i.e. for collecting configuration data and re-implementing it in the other organization, and may only give limited possibilities to investigate incidents. For example, bugs or certain behaviour being independent on the configuration data is will be difficult to reproduce in this scenario.

Migrating the entire application state as proposed by King, S. T. et al., and Cully, B. et al., may not be helpful in an environment that involves two different organizations. The state of the application may include data that is either user-specific, such as mobility contexts, and/or access credentials that one organization might not want to make available outside of its domain. As such, complete migrations outside a domain are both a privacy and security issue, and depending on the legislation, to which the two companies may need to conform, might even pose issues from the perspective of data storage policies.

Partial migration as proposed by Hou, K.-Y. et al., fails to identify data that needs to remain private. Li, T. et al., and US20140095821 A1 assume that an entire process part of a VM could be excluded when containing private information. However, excluding an entire process out of the VM does not allow investigating errors or abnormal behaviour in exactly that process, which might be key to debugging an enterprise or telecom application. Zhang, F. et al. disclose a technique that has a process-level granularity and the migration manager will decrypt the data being encrypted at destination.

There is hence a need to address at least some of the issues outlined above.

SUMMARY

It is an object of exemplary embodiments herein to address at least some of the issues outlined above and to provide selectively migrating data of a virtualized network function instance from a first administrative domain to a second administrative domain.

This object and others are achieved by attached independent claims and by the exemplary embodiments according to the dependent claims.

According to an aspect, the exemplary embodiments provide a method of selectively migrating data of a virtualized network function instance from a first administrative domain to a second administrative domain. The method comprises reading second data used within a single process of the VNF instance within the first administrative domain, where read second data comprises marked data and non-marked data. The method also comprises overwriting the marked data with anonymous data according to a pre-configured policy. In addition, the method comprises transferring the data comprising said anonymous data and said non-marked data, to the second administrative domain.

According to another aspect, the exemplary embodiments provide an arrangement that is capable of selectively migrating data of a virtualized network function instance from a first administrative domain to a second administrative domain. The arrangement comprises a processing circuit and a memory circuit. The memory circuit has instructions being executable by the processor circuit. The processing circuit is configured, when executing the instructions, to read second data used within a single process of the VNF instance within the first administrative domain. The read second data comprises marked data and non-marked data. The processing circuit is also configured, when executing the instructions, to overwrite the marked data with anonymous data according to a pre-configured policy. In addition, the processing circuit is configured, when executing the instructions, to transfer the data comprising said anonymous data and said non-marked data, to the second administrative domain.

According to yet another aspect, the exemplary embodiments provide an arrangement that is capable of selectively migrating data of a virtualized network function instance from a first administrative domain to a second administrative domain. The arrangement comprises a first module for reading second data used within a single process of the VNF instance within the first administrative domain, where read second data comprises marked data and non-marked data. The arrangement also comprises a second module for overwriting the marked data with anonymous data according to a pre-configured policy. In addition, the arrangement comprises a third module for transferring the data comprising said anonymous data and said non-marked data, to the second administrative domain.

According to further aspects, this object and others are also achieved by a computer program comprising computer readable code which when run on at least one processing circuit, causes the at least one processing circuit to carry out the method of said another aspect above.

Advantages of the present disclosure comprise:

It is advantageous that the present disclosure allows determining which areas within a process need to be protected.

The present disclosure enables an operator to comply with legislation that may forbid making certain data available outside an operator domain, while providing adequate support from application or VNF developer domain.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

The present disclosure relates to implementing selective migration of an instance of an application or virtualized network function (VNF) between a first and a second administrative domain. The first administrative domain may for example be an organization such as a telco provider, or operator, that owns the instance of said application or VNF. The second administrative domain may for example be an organization or entity that developed the application or VNF, or implemented code for said instance of the application or VNF.

The second administrative organization has information about content of the memory storing the instance of the application of the VNF. For example, the VNF developer may have pre-marked parts of the memory, which parts comprise potentially sensitive data.

The second administrative domain, for example the VNF developer, having knowledge about the code of the instance of the application or VNF, has pre-determined said code by a set of marking elements. These marking elements may denote positions in the code which comprise potentially sensitive data.

In the first administrative domain, a memory storing content of an instance of the application of the VNF may thus comprise parts pre-marked by the marking elements of the memory storing an instance of the application or the VNF. The telco operator, in the first administrative domain, may then specify a policy that defines which one of these marked elements, or items, indeed comprise sensitive data and therefore are of special interest to them. Upon reading out the content of the memory the operator and may thus decide how to overwrite read out information at these elements or items. The operator may, for example, select none, one or some of all marked items/elements to overwrite.

It is pointed out that whereas the memory may comprise marked elements, the process of over-writing is carried out only on data read out from the memory.

Marked elements of content of the memory may comprise variables.

For the purpose of debugging of an instance of an application or a VNF, a selective migration of data thereof may be initiated. Having initiated migration, a migration trigger may be sent to a migration gateway function.

At the time a state migration operation is triggered on a running instance of the VNF or application, a migration gateway function may examine ongoing transfer, read data being marked and over-write content thereof before making it available outside the first administrative domain, being for example the operator domain.

State is herein considered to comprise data associated with a current representation of a VNF or application instance during runtime. State may comprise data that describes a current run-time status and configuration of a program such as an instance of a VNF or application with variable values, parameters values etc. These values may hence be unique to its current constellation.

As such, state migration properties within the domain of the operator may be preserved, whereas debugging operations in the second administrative domain are facilitated. Migration of instances of high-availability and regular-availability is not affected.

The migration gateway function may be considered to intervene during transfer of an instance state of an application or a VNF state between two administrative domains. It may also be determined that a state transfer for an application of VNF is triggered between two separate administrative domains. The migration gateway function may also comprise identifying memory locations that may need to be privacy-preserved during the transfer by use of a mark in the memory map at said memory locations. The migration gateway function may also comprise performing a privacy-preserving operation on the memory locations as memory content is transferred between the two domains.

There are further applications of this disclosure, comprising network forensics and lawful interception scenarios involving third parties. Another application may be run-time analytics of live services offered as-a-service by a developer of the VNF. The run-time analytics might act like a continuous recommendation system for an operator with hints on how to optimize service deployment and configurations.

Figure 1:
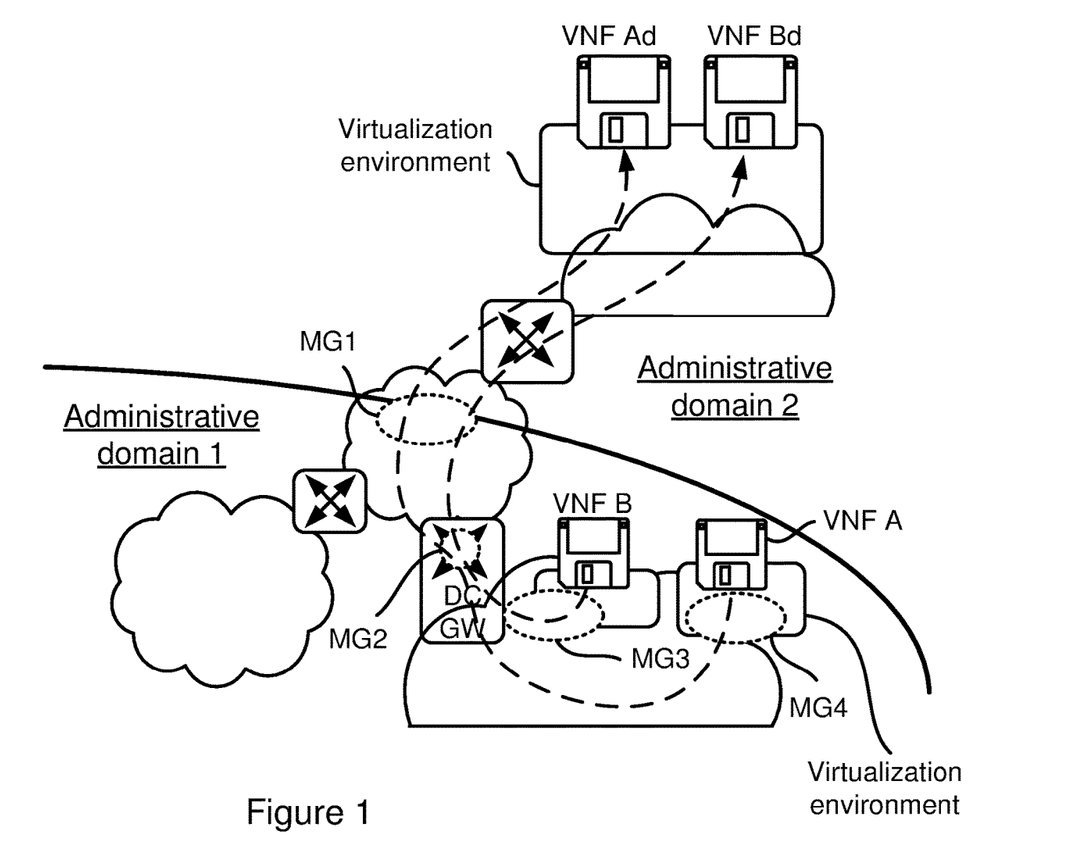
FIG. 1 schematically illustrates one example of a layout of administrative domains according to the present disclosure.

FIG. 1 schematically illustrates one example of a layout of administrative domains according to the present disclosure. The layout comprises administrative domain 1 and administrative domain 2. Administrative domain 1 may be owned by a telco operator, whereas administrative domain 2 may be owned by a developer of a VNF. A number of instances of VNFs or applications are typically executing in the administrative domain 1. In this example two VNF instances, illustrated in FIG. 1 and denoted as VNF A and VNF B, need to be debugged.

VNF A and VNF B may be the same type of VNF. For instance both VNF A and VNF B may be deep packet inspection (DPI) VNFs or firewall VNFs. VNF A and VNF B may alternatively be different types of VNFs, for example VNF A being a DPI VNF, whereas VNF B being a firewall VNF.

FIG. 1 also illustrates two examples of migration pathways along which data of VNF instances may be migrated. One pathway is for migrating data for VNF A from administrative domain 1 to a replicated VNF Ad located in administrative domain 2, whereas the other is for migrating data for VNF B from administrative domain 1 to a replicated VNF Bd located in administrative domain 2.

In FIG. 1, the VNF A in the administrative domain 1 is located within a virtualization environment of a data centre fabric. The VNF B in the administrative domain 1 is located within another virtualization environment of the data centre fabric. The replicated VNF Ad and VNF Bd of the administrative domain 2 are located in a virtualization environment in a data centre fabric.

An operator in the administrative domain 1 may start a debugging session for VNF A and potentially also VNF B. Debugging may be performed in parallel, sequentially or one of them being debugged at any given point in time.

Each VNF instance includes code portions, such as marked data, identifying one or more variables as forbidden to be transferred across the border between the two administrative domains, i.e. from administrative domain 1 to administrative domain 2.

FIG. 1 illustrates multiple migration gateways, MG1, MG2, MG3 and MG4, for the purpose of exemplifying possible locations for implementing of MGs. These migration gateways shall mainly be understood as alternatives. Migration of selective content is usually performed by a single MG according to exemplary embodiments. However, two or more MGs may be used for performing migration of selective content.

In order to avoid transferring sensitive data such as security data, certain portions of memory content may be protected before performing transferring of memory data across administrative domains.

Sensitive or security data is advantageously pre-marked, i.e. said data may be marked in beforehand. Data stored in a memory may be marked by using a bitmap or similar, such that the data is locally marked based on its location in the memory.

Dependent on the location of the migration gateway, the functionality of the migration gateway function may differ.

In FIG. 1, migration gateway (MG) 1, is located on the logical border between the administrative domains 1 and 2. This border may be a border between an operator domain and a developer domain. It is here assumed that data being migrated is not encrypted. The MG1 may read data used within a single process of an instance of VNF A or VNF B within administrative domain 1, where the read data comprises marked data and non-marked data. The MG1 may then overwrite the marked data with anonymous data following a policy that is pre-configured by the operator. The MG1 may then transfer data comprising said anonymous data and said non-marked data, to the administrative domain 2.

FIG. 1 also comprises an alternative MG location. MG2 is located in a data centre (DC) gateway (GW) within the administrative domain 1, i.e. here the operator domain. As for the MG1, it is assumed that data to be migrated is not encrypted. As for MG1 the MG2 may read data used within a single process of an instance of VNF A of VNF B within administrative domain 1, where the read data comprises marked data and non-marked data. The MG2 may then overwrite the marked data with anonymous data following a policy that is pre-configured by the operator. The MG2 may then transfer data comprising said anonymous data and said non-marked data, to the administrative domain 2.

Similarly, FIG. 1 also illustrates an alternative location of a migration gateway, in that MG3 is located within a virtualization environment or a cloud environment, within a server on which VNF B is executed, in administrative domain 1. As above, MG3 assumes that traffic being transferred along a path in FIG. 1 is not encrypted. MG3 may be considered to inspect ongoing transfer of data from a single process, and read marked data and non-marked data. As for MG2, the MG3 may thus read data used within the single process of an instance of VNF A of VNF B within administrative domain 1, where the read data comprises marked said data and non-marked data. The MG3 may then overwrite the marked data with anonymous data following a policy that is pre-configured by an operator. The MG3 may then transfer data comprising said anonymous data and said non-marked data, to the administrative domain 2.

In addition, FIG. 1 also comprises a further alternative location of a migration gateway, in that MG4 is located within a virtualization environment or a cloud environment, as part of a migration function of the cloud execution environment in the operator domain. MG4 may be considered to be located between a memory and a migration gateway function. The MG4 therefore has direct access to the data stored in the memory. Henceforth, the MG4 may process data directly accessible from a memory. The memory may have certain locations in which sensitive data or security data is stored. These locations may be pre-marked. MG4 having direct-access to the memory may hence read from the memory and pre-mark data packets read from pre-marked locations in the memory. MG4 may then forward pre-marked data towards a migration functionality reading marked data and over-writes the marked data or blocks with anonymous data in accordance with a policy that is pre-configured by an operator. The MG4 may then make this marked data available to a migration function that selectively migrates data over a network to the administrative domain 2. The anonymous data may be chosen to maintain the meaning or semantics of the marked data. This enables debugging at the administrative domain 2, without interruptions.

As for MG1, the MG4 may read data used within a single process of an instance of VNF A within administrative domain 1, where the read out data comprises the marked data and non-marked data. The MG4 may hence overwrite the marked data with anonymous data following a policy that is pre-configured by the operator. The MG4 may then transfer data comprising said anonymous data and said non-marked data, to replicated VNF A of the administrative domain 2.

Figure 2:
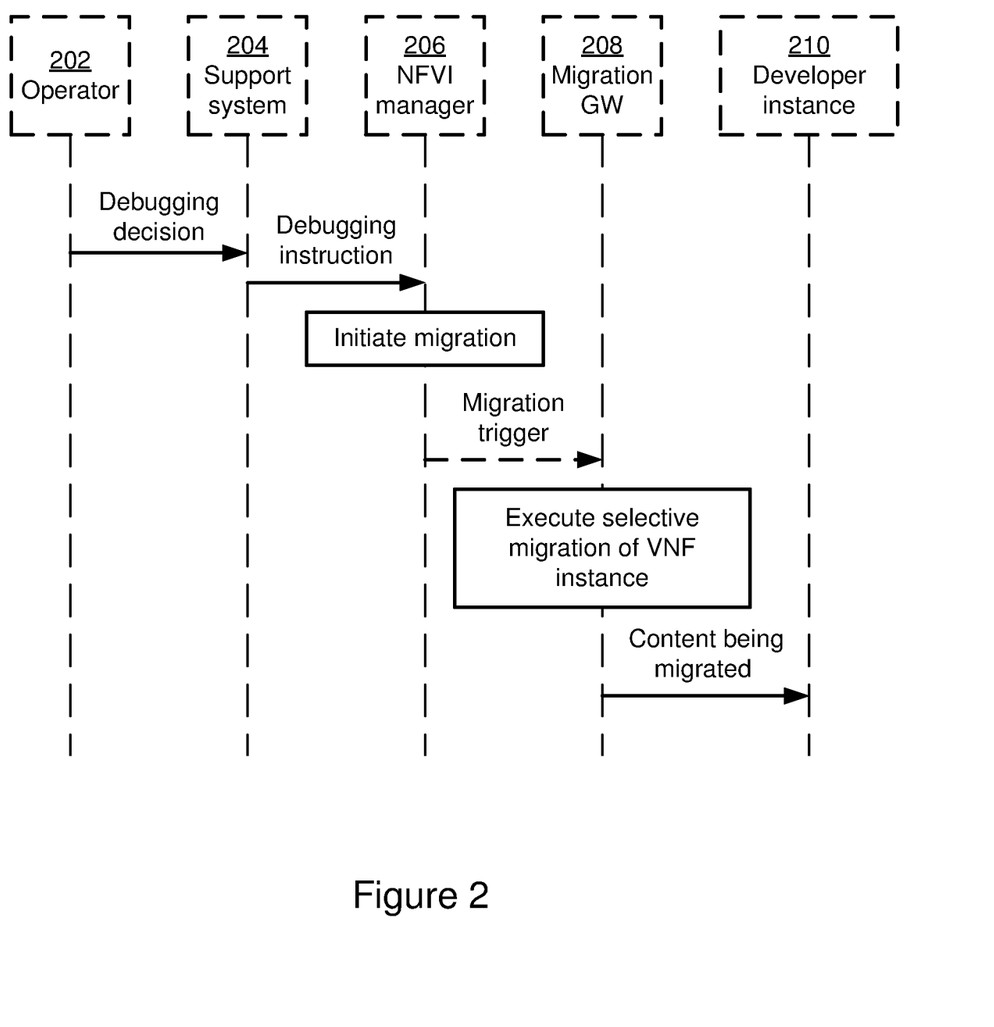
FIG. 2 schematically presents a signalling diagram related to a migration gateway function according some examples of the present disclosure.

FIG. 2 schematically presents a signalling diagram related to a migration gateway function according some examples of the present disclosure. Signalling may be performed between an operator 202, a support system 204, a network functions virtualization (NFV) instance manager 206, a migration gateway (MG) 208 and a develop instance 210. Upon agreement between the developer and the operator, the operator may initiate a transfer of an instance of a VNF towards the developer by triggering a relevant support system 204.

The operator 202 may take a decision to start debugging of one of more VNF instances.

The decision may be communicated to a support system 204 such as a network management system (NMS) or an operation support system (OSS). Based on the received debugging decision, the support system 204 may send a debugging instruction to the NFVI manager 206. Based on receipt of said debugging instruction the NFVI manager 206, may in turn initiate a state transfer and optionally, indicate which MG to use in the transferring/migration process. The NFVI manager 206 may start a state transfer between an instance, i.e. VNF A or VNF B, executing in an operator domain, administrative domain 1, and corresponding replicated instances, VNF Ad and VNF Bd, by sending a migration trigger to the MG 208. These replicated instances execute in the developer domain, administrative domain 2. State transfer may here denote transfer of data at a certain point in time.

Based on the received migration trigger, the MG 208 may execute selective migration of an instance of VNF A or VNF B. The state transfer may be a one-time process. It may alternatively be a continuous transfer depending on a nature of an investigation/debugging to be performed. The MG 208 hence selectively migrates content from one administrative domain to another administrative domain. Content being migrated may thus be selectively transferred across two domains to the developer instance 210 of said another administrative domain.

While state data is being transferred between the two VNF instances, the process of replicating the state may be considered to be ongoing and for which the reason the migration gateway may need to continuously mark or mask, e.g. over-write, data in the memory at marked locations comprising data not be transferred outside the administrative domain 1. The transfer process with state replication may be terminated as agreed in beforehand between the operator 202 and the developer instance 210, or optionally unilaterally by the operator 202.

Anonymous data may comprise black-marked data, i.e. data that makes no sense to the domain towards which data is being transferred, for instance the developer domain. Upon transferring black-marked data outside its own administrative domain, it may suffice to transfer only start and end sections of the black-marked data, in order to enable remaining parts or sections being transferred to end up in memory locations being meaningful to the application or VNF instance of which data is transferred. Transferring black-marked data may be triggered in way that is compressed, by pointing to a starting location of a memory block.

Figure 3:
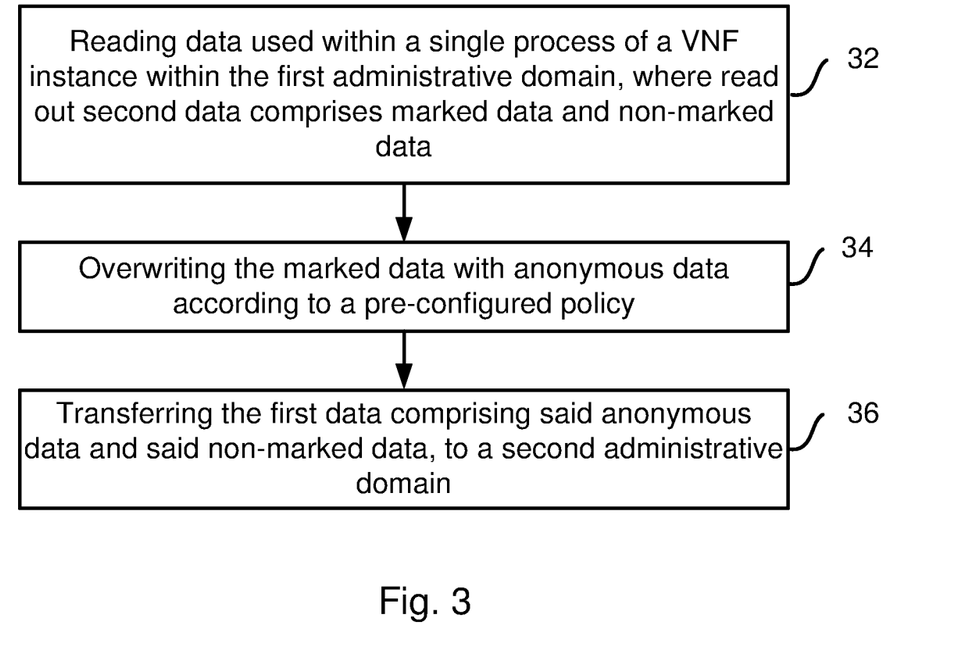
FIG. 3 presents actions in a flowchart of a method according to some examples of the present disclosure.

FIG. 3 presents a flow chart of actions within a method of selectively migrating data of a VNF instance from a first administrative domain to a second administrative domain.

The method comprises the following actions:

Action 32: The method comprises reading second data used within a single process of the VNF instance within the first administrative domain, where the read second data comprises marked data and non-marked data.

Action 34: The method also comprises overwriting the marked data with anonymous data according to a pre-configured policy.

Action 36: In addition, the method comprises transferring the data comprising said anonymous data and said non-marked data, to the second administrative domain.

Action 34 may comprise overwriting the marked data with anonymous data that maintains semantics of the marked data.

Action 34 may comprise overwriting the marked data with anonymous data according to a pre-configured policy comprises retrieving said anonymous data from a storage, according to the pre-configured policy.

The method may further comprise receiving said second data, used within the single process of the VNF instance, in a stream of data packets being transferred towards the second administrative domain.

The anonymous data may comprise data packets having a certain mark.

The marked data may comprise data that occupies a certain area of a memory that is associated with the VNF instance. The certain area may be defined by a number of locations according to an overlay of said memory. The overlay may comprise a bitmap.

Action 34 of overwriting may be triggered by a migration trigger that is received from a network functions virtualization infrastructure (NFVI) manager.

Transferring the data may comprise transferring a state of the instance of the VNF or the application.

The present disclosure also comprises a computer program that is configured, when run on a computer, to selectively migrate data of a VNF instance from a first administrative domain to a second administrative domain. The computer program is further configured, when run on the computer, to read second data used within a single process of the VNF instance within the first administrative domain, where read second data comprises marked data and non-marked data. The computer program is further configured, when run on the computer, to overwrite the marked data with anonymous data according to a pre-configured policy. In addition, the computer program is configured to, when run on the computer, transfer the data comprising said anonymous data and said non-marked data, to the second administrative domain.

The present disclosure also comprises a computer program product comprising a computer-readable storage medium and the computer program, as above, wherein the computer program is stored on the computer readable storage medium.

Figure 4:
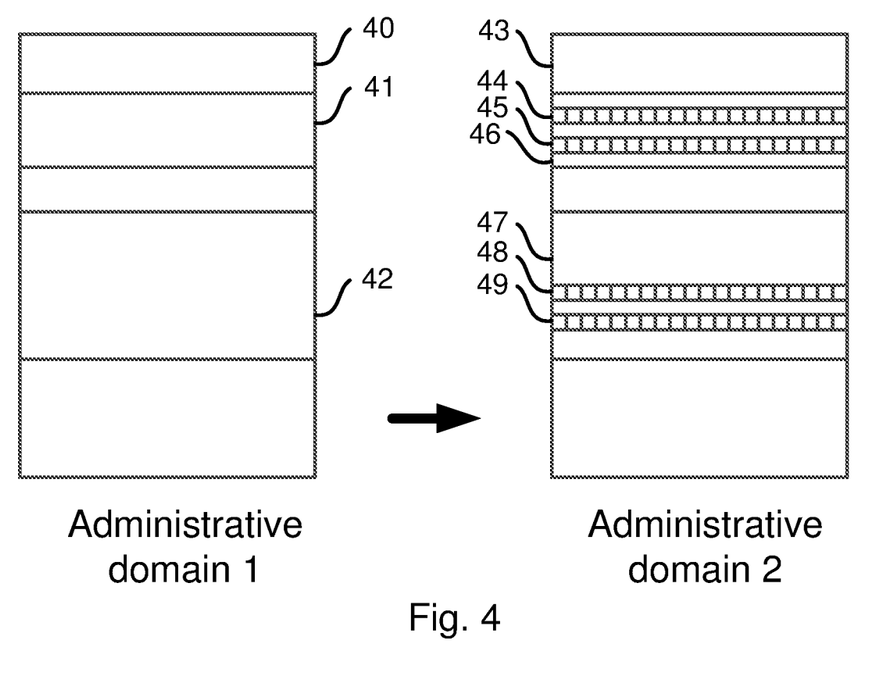
FIG. 4 schematically illustrates a memory according to some examples of the present disclosure.

FIG. 4 schematically illustrates a memory, related to examples of the present disclosure. This memory is capable of storing data for the instance of VNF or application running in a server in a virtualized environment in the administrative domain 1. The memory comprises several blocks 40, 41, 42, 43, in which a singular process is executed in each block.

As explained earlier, the memory is advantageously pre-marked by an operator, i.e. it comprises locations, which are pre-marked by the operator.

The left side of FIG. 4 comprises said memory in the administrative domain 1. Out the blocks in the memory, blocks 41 and 42 are pre-marked. Upon transfer the instance of VNF, to the administrative domain 2, data from marked blocks are over-written by anonymous data, preserving sensitive or security data and hindering said data from being transferred outside administrative domain 1 to administrative domain 2. Upon transferring data from marked block 41, it is revealed that blocks 44 and 45 comprise anonymous data in the administrative domain 2. Block 46 however comprises data as migrated from block 41 located in the administrative domain 1.

Similarly, upon migrating data from marked block 42 from administrative domain 1, certain blocks such as block 47 comprises data as transferred from block 42. However, blocks 48 and 49 comprise anonymous data, as a result of marked data located in block 42 in the administrative domain 1.

By marking a memory at certain locations, selective data from singular processes may be preserved and hindered from being transferred outside a certain administrative domain.

Marking of memory blocks may be performed by attaching a bit or code word to each memory location or memory page in a compiler or interpreter of the VNF or application code. This may be performed in line with specifications as included in the code. For instance, specifications may include a value of the code word or the location of a bit in the memory management structure. One example may be to specify a certain type of data, for example "do_not_migrate_u64" or defining a modifier such as "do_not_migrate_u64" in the syntax of a programming language that does not allow a developer to directly allocate memory. Examples of such programming languages are Java, Python, and Ruby. The corresponding programming language execution environment, such as JVM for Java, and the Python interpreter, may then need to translate this modifier onto an operating system call that marks the with a semantic meaning, "do not migrate". Furthermore, an extension of a virtualization library may be needed in order to read memory locations marked "do not copy" in order to allow the a migration gateway to read such locations during a transfer out of its administrative domain, but still preserve the parameter values when data of the instance state is saved within the present domain.

Figure 5:
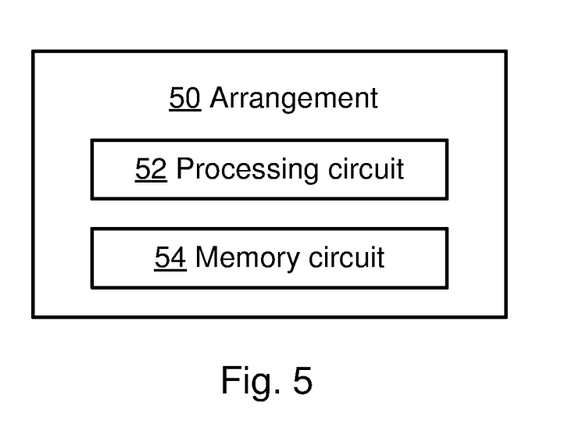
FIGS. 5 and 6 schematically illustrate arrangements capable of selectively migrating data, according to some examples of the present disclosure.

FIG. 5 schematically presents an arrangement 50 that is capable of selectively migrating data of a VNF instance from a first administrative domain to a second administrative domain. The arrangement comprises a processing circuit 52 and a memory circuit 54. The memory circuit has instructions being executable by the processor circuit. The processing circuit is configured, when executing the instructions, to read second data used within a single process of the VNF instance within the first administrative domain. The read second data comprises marked data and non-marked data. The processing circuit is also configured, when executing the instructions, to overwrite the marked data with anonymous data according to a pre-configured policy. In addition, the processing circuit is configured, when executing the instructions, to transfer the data comprising said anonymous data and said non-marked data, to the second administrative domain.

The processing circuit 52 may be configured, when executing the instructions, to overwrite the marked data with anonymous data that maintains semantics of the marked data.

The processing circuit 52 may be configured, when executing the instructions, to retrieve said anonymous data from a storage according to the pre-configured policy.

The processing circuit 52 may be configured, when executing the instructions, to receive said second data, used within the single process of the VNF instance, in a stream of data packets being transferred towards the second administrative domain.

Said anonymous data may comprise data packets having a certain mark.

The marked data may comprise data that occupies a certain area of a memory that is associated with the VNF instance, where the certain area is defined by a number of locations according to an overlay of said memory.

The overlay may comprise a bitmap.

The processing circuit 52 may be configured, when executing the instructions, to overwrite the marked data with anonymous data according to a pre-configured policy, triggered by a migration trigger received from a network functions virtualization infrastructure (NFVI) manager.

This migration trigger is also exemplified in FIG. 2.

Figure 6:
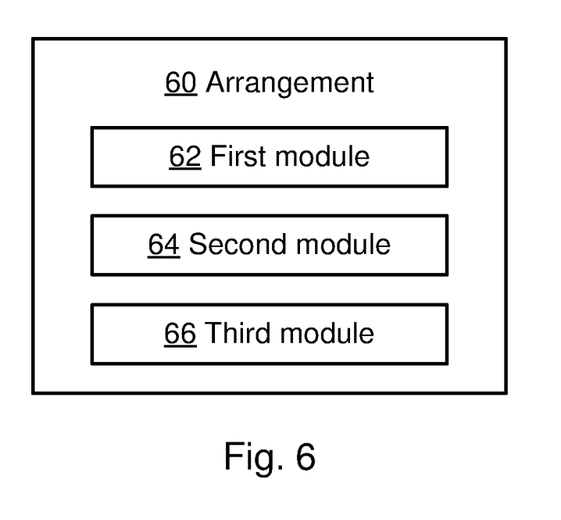

FIG. 6 schematically presents an arrangement 60 that is capable of selectively migrating data of a VNF instance from a first administrative domain to a second administrative domain. The arrangement 60 comprises a first module 62 for reading second data used within a single process of the VNF instance within the first administrative domain, where read second data comprises marked data and non-marked data.

The arrangement also comprises a second module 64 for overwriting the marked data with anonymous data according to a pre-configured policy.

In addition, the arrangement also comprises a third module 66 for transferring the data comprising said anonymous data and said non-marked data, to the second administrative domain.

Each one of the first, second and third modules 62, 64, 66 may be connected to at least one other module of the first, second and third modules.

The arrangement 60 may comprise a migration gateway function.

The present disclosure also comprises an arrangement that is capable of selectively migrating data of a VNF instance from a first administrative domain to a second administrative domain. This arrangement is configured to read second data used within a single process of the VNF instance within the first administrative domain, where the read second data comprises marked data and non-marked data. This arrangement is also configured to overwrite the marked data with anonymous data according to a pre-configured policy. In addition, this arrangement is configured to transfer the data comprising said anonymous data and said non-marked data, to the second administrative domain.

The present disclosure has the following advantages:

It is advantageous that the present disclosure allows determining which areas within a process need to be protected.

The present disclosure enables an operator to comply with legislation that may forbid making certain data available outside an operator domain, while providing adequate support from application or VNF developer domain.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

API application interface
DC data centre
DPI deep packet inspection
GW gateway
NFVI network functions virtualization infrastructure
NMS network management system
OSS operations support system
VM virtual machine
VNF virtualized network function

The invention claimed is:

1. A method of selectively migrating data of a virtualized network function (VNF) instance from a first administrative domain to a second administrative domain where the data is not encrypted, the method comprising:
reading data used within a single process of the VNF instance within the first administrative domain, where the data comprises a portion marked as marked data;
overwriting the marked data with anonymous data according to a pre-configured policy, wherein the anonymous data comprises black-marked data; and
transferring the data unencrypted, where said anonymous data is in place of the marked data, but in which only start and end sections of the anonymous data are provided for transfer, instead of transferring the anonymous data, to the second administrative domain.

2. The method according to claim 1, wherein the overwriting further comprises overwriting the marked data with anonymous data that maintains semantics of the marked data.

3. The method according to claim 1, wherein the overwriting the marked data with anonymous data according to a pre-configured policy further comprises retrieving said anonymous data from a storage, according to the pre-configured policy.

4. The method according to claim 1, further comprising receiving said data, used within the single process of the VNF instance, in a stream of data packets being transferred towards the second administrative domain.

5. The method according to claim 1, wherein said anonymous data comprises data packets having a certain mark.

6. The method according to claim 1, wherein the marked data comprises data that occupies a certain area of a memory associated with the VNF instance, the certain area being defined by a number of locations according to an overlay of said memory.

7. The method according to claim 6, wherein the overwriting is triggered by a migration trigger received from a network functions virtualization infrastructure manager.

8. The method according to claim 6, wherein the overlay comprises a bitmap.

9. A non-transitory computer-readable storage medium having stored there on a computer program which, when executed by a processor, causes migration of data of a virtualized network function (VNF) instance from a first administrative domain to a second administrative domain where the data is not encrypted, by performing operations comprising:
reading data used within a single process of the VNF instance within the first administrative domain, where the data comprises a portion marked as marked data;
overwriting the marked data with anonymous data according to a pre-configured policy, wherein the anonymous data comprises black-marked data; and
transferring the data unencrypted where said anonymous data is in place of the marked data, but in which only start and end sections of the anonymous data are provided for transfer, instead of transferring the anonymous data, to the second administrative domain.

10. An apparatus capable of selectively migrating data of a virtualized network function (VNF) instance from a first administrative domain to a second administrative domain where the data is not encrypted, the apparatus comprising:
a processing circuit; and
a memory, the memory having instructions which, when executed by the processing circuit, configures the apparatus to:
read data used within a single process of the VNF instance within the first administrative domain, where the data comprises a portion marked as marked data;
overwrite the marked data with anonymous data according to a pre-configured policy, wherein the anonymous data comprises black-marked data; and
transfer the data unencrypted where said anonymous data is in place of the marked data, but in which only start and end sections of the anonymous data are provided for the transfer, instead of transfer of the anonymous data, to the second administrative domain.

11. The apparatus according to claim 10, where said processing circuit, when executing the instructions, is configured to overwrite the marked data with anonymous data that maintains semantics of the marked data.

12. The apparatus according to claim 10, where said processing circuit, when executing the instructions, is configured to retrieve said anonymous data from a storage, according to the pre-configured policy.

13. The apparatus according to claim 10, wherein said processing circuit, when executing the instructions, is further configured to receive said data, used within the single process of the VNF instance, in a stream of data packets being transferred towards the second administrative domain.

14. The apparatus according to claim 10, wherein said anonymous data comprises data packets having a certain mark.

15. The apparatus according to claim 10, wherein the marked data comprises data that occupies a certain area of a memory that is associated with the VNF instance, where the certain area is defined by a number of locations according to an overlay of said memory.

16. The apparatus according to claim 15, wherein said processing circuit, when executing the instructions, is further configured to overwrite the marked data with anonymous data according to a pre-configured policy, when triggered by a migration trigger received from a network functions virtualization infrastructure manager.

17. The apparatus according to claim 15, wherein the overlay comprises a bitmap.

18. The apparatus according to claim 10, comprising a migration gateway function to perform the migrating of the data.

\* \* \* \* \*